(12) United States Patent
Hashizume et al.

(10) Patent No.: US 10,985,840 B2
(45) Date of Patent: Apr. 20, 2021

(54) INFORMATION TRANSMISSION SYSTEM TRANSMITTING VISIBLE OPTICAL SIGNAL RECEIVED BY VIDEO CAMERA

(71) Applicants: Inter-University Research Institute Corporation Research Organization of Information and Systems, Tokyo (JP); NATIONAL UNIVERSITY CORPORATION HOKKAIDO UNIVERSITY, Hokkaido (JP)

(72) Inventors: Hiromichi Hashizume, Tokyo (JP); Masanori Sugimoto, Sapporo (JP); Takayuki Akiyama, Tokyo (JP); Hayato Kumaki, Sapporo (JP); Shota Shimada, Sapporo (JP)

(73) Assignees: INTER-UNIVERSTY RESEARCH INSTITUTE CORPORATION RESEARCH ORGANIZATION OF INFORMATION AND SYSTEMS, Tokyo (JP); NATIONAL UNIVERSITY CORPORATION HOKKAIDO UNIVERSITY, Hokkaido (JP)

( * ) Notice: Subject to any disclaimer, the term of this patent is extended or adjusted under 35 U.S.C. 154(b) by 0 days.

(21) Appl. No.: 16/630,155

(22) PCT Filed: Jul. 2, 2018

(86) PCT No.: PCT/JP2018/025024
§ 371 (c)(1),
(2) Date: Jan. 10, 2020

(87) PCT Pub. No.: WO2019/013023
PCT Pub. Date: Jan. 17, 2019

(65) Prior Publication Data
US 2020/0169322 A1 May 28, 2020

(30) Foreign Application Priority Data

Jul. 11, 2017 (JP) .............................. JP2017-135654

(51) Int. Cl.
*H04B 10/116* (2013.01)
*H04B 10/516* (2013.01)
(Continued)

(52) U.S. Cl.
CPC ....... *H04B 10/116* (2013.01); *H04B 10/5165* (2013.01); *H04B 10/548* (2013.01); *H04B 10/69* (2013.01)

(58) Field of Classification Search
None
See application file for complete search history.

(56) References Cited

U.S. PATENT DOCUMENTS

2010/0067916 A1* 3/2010 Suzuki ................ H04B 10/116
 398/130
2012/0328302 A1* 12/2012 Iizuka .................. H04B 10/69
 398/130
(Continued)

FOREIGN PATENT DOCUMENTS

CA 2 927 809 7/2015
JP 2010130603 A * 6/2010
(Continued)

OTHER PUBLICATIONS

Translation of the International Preliminary Report on Patentability dated Jan. 23, 2020 in International (PCT) Application No. PCT/JP2018/025024.
(Continued)

*Primary Examiner* — David W Lambert

(57) ABSTRACT

An information transmitter apparatus for use in an information transmission system is provided, where the information transmission system includes the information transmitter
(Continued)

apparatus and an information receiver apparatus. The information transmitter apparatus transmits a surface-shaped visible light signal using a light source, where the visible light signal is modulated according to a modulated signal modulated using a plurality of respective-order carriers different from each other, and the respective-order carriers has a fundamental frequency and multiple frequencies of a frame output signal of a video camera of rolling shutter system provided in an information receiver apparatus. The information receiver apparatus receives the visible light signal using the video camera. The information transmitter apparatus includes a modulator that quadrature-amplitude-modulates the respective-order carriers in accordance with input digital data signal, and inverse-Fourier-transforms modulated carriers to generate the modulated signal.

14 Claims, 6 Drawing Sheets

(51) Int. Cl.
*H04B 10/548* (2013.01)
*H04B 10/69* (2013.01)

(56) References Cited

U.S. PATENT DOCUMENTS

| | | | | |
|---|---|---|---|---|
| 2014/0086590 | A1* | 3/2014 | Ganick | H04W 12/06 |
| | | | | 398/118 |
| 2014/0193162 | A1 | 7/2014 | Iizuka et al. | |
| 2014/0286644 | A1* | 9/2014 | Oshima | H04B 10/116 |
| | | | | 398/118 |
| 2015/0023673 | A1 | 1/2015 | Iizuka et al. | |
| 2015/0098709 | A1* | 4/2015 | Breuer | G06K 9/34 |
| | | | | 398/118 |
| 2016/0191158 | A1* | 6/2016 | Aoyama | H04B 10/54 |
| | | | | 398/172 |
| 2016/0359560 | A1* | 12/2016 | Baggen | H05B 47/19 |

FOREIGN PATENT DOCUMENTS

| | | |
|---|---|---|
| JP | 2013-9072 | 1/2013 |
| JP | 2013-9074 | 1/2013 |
| JP | WO2013/175803 | 11/2013 |
| JP | 2016085208 A * | 5/2016 |

OTHER PUBLICATIONS

International Search Report dated Sep. 4, 2018 in International (PCT) Application No. PCT/JP2018/025024.

Takayuki Akiyama et al., "Time Synchronization Method Using Visible Light Communication for Smartphone Localization", ICWMC 2016: The Twelfth International Conference on Wireless and Mobile Communication including QoSE WMC 2016, Barcelona, Spain, Nov. 2016.

Christos Danakis et al., "Using a CMOS Camera Sensor for Visible Light Communication", IEEE Workshop on Optical Wireless Communication, Anaheim, California, USA, Dec. 2012.

Shota Shimada et al., "OFDM Visible Light Communication using off-the-shelf video camera", IEICE Technical Report, Jul. 12, 2017, vol. 117, No. 133, pp. 133-138, fig. 2, 6, SR2017-50, with English abstract.

* cited by examiner

INFORMATION TRANSMISSION SYSTEM TRANSMITTING VISIBLE OPTICAL SIGNAL RECEIVED BY VIDEO CAMERA

TECHNICAL FIELD

The present invention relates to an information transmission system that transmits information using, for example, surface-emitting visible optical communication, and also relates to an information transmitter apparatus, an information receiver apparatus, and a program each for use in the information transmission system.

BACKGROUND

Although visible optical communications have been attempted for a long time, their research and development have become popular since the tablet terminals and smartphone become popular 2010 years later.

Casio's Picapicamera has pioneered commercialization in Japan (see, for example, Patent Documents 1 and 2). An emitting light source thereof is embedded in a board of microcomputer, and the optical signal from the emitting light source is received by the smartphone using application software. The optical signal from the light source and the video frame from the camera are not always synchronized with each other. The transmission rate is about 10 bps or less.

In contrast, we discloses the "time synchronization method using visible light communication" in Patent document 1, which performs visible optical communication faster than that of above camera using emission of a point light source.

Meanwhile, Panasonic Corporation made such an attempt as visional optical communication technique utilizing the characteristic of rolling shutter operation of CMOS (Complementary metal-Oxide Semiconductor) video camera, which has been widely adapted in smartphones (See, for example, Patent Document 3). The patent technique has such features that a surface light source is used instead of the point light source for the light source of the visible optical communication, and the operation of the rolling shutter of the camera is used together with the surface light source. Further, in order to receive a rapid luminance change of the light source, the patent technique has such a feature that an exposure time ratio of the electronic shutter of the camera (which is defined as a time ratio indicating substantially how many seconds the light receiving element receives the light in the video frame of 1/60 seconds) is set to a very short value such as several percent or less, so that the light source emits the light as strobe, to thereby establish the rapid luminance change with distinguishing the binary value of light line and dark line on scanning lines of the rolling shutter. The advantageous effect thereof is that a commercial camera can transmit data at a transmission rate of several kbps.

Further, "the visible optical communication method" disclosed in Non-Patent Document 2 similarly disclosed such a success of communication rate of several bps using a video camera with a light source of short time light emitting and with a small exposure time ratio of the shutter. However, the method used a black and white pattern modulation method using electrical characteristics different from those of the invention disclosed in Patent Document 3.

PRIOR ART DOCUMENTS

Patent Literature

Patent Document 1: Japanese patent-laid-open publication No. JP2013-009072A;

Patent Document 2: Japanese patent-laid-open publication No. JP2013-009074A; and Patent Document 3: International Application Publication WO2013/175803A1.

Non-Patent Literature

Non-Patent Document 1: Takayuki Akiyama et al., "Time Synchronization Method Using Visible Optical communication for Smartphone Localization", ICWMC 2016: The Twelfth International Conference on Wireless and Mobile Communication including QoSE WMC 2016, Barcelona, Spain, November 2016; and Non-Patent Document 2: Danakis, et. al., "Using a CMOS Camera Sensor for Visible Optical communication," IEEE Workshop on Optical Wireless Communication, Anaheim, Calif., USA, December 2012.

SUMMARY OF THE INVENTION

Problems to be Solved by the Invention

Generally speaking, the methods using these rolling shutters can obtain a communication rate higher than that of the method using the point light source, however, those methods have such a problem that the rate upper limit that can be achieved is less than or equal to the number kbps, and it is not sufficient for many communication applications. In addition, since light from a planar light source is received by the entire camera field of view, for example, when backlight illumination of a liquid crystal display apparatus is used as a communication light source, there is a problem that communication is hindered if there is display content.

An object of the present invention is to solve the above problems, and provide an information transmission system capable of performing visible optical communication at a higher rate than the prior art, provide an information transmitter apparatus and information, an information receiver apparatus and information and a program each for use in the information transmission system.

Means for Solving the Problems

According to the first aspect of the present invention, there is provided an information transmitter apparatus for use in an information transmission system. The information transmission system includes the information transmitter apparatus and an information receiver apparatus. The information transmitter apparatus transmits a surface-shaped visible light signal using a surface light source, where the visible light signal is modulated according to a modulated signal modulated using a plurality of respective-order carriers different from each other, and the respective-order carriers have a fundamental frequency and multiple frequencies of a frame frequency waveform of a video camera of rolling shutter type provided in an information receiver apparatus. The information receiver apparatus receives the visible light signal using the video camera. The information transmitter apparatus includes modulator means that quadrature-amplitude-modulates the respective-order carriers in accordance with input digital data signal, and inverse-Fourier-transforms modulated carriers to generate the modulated signal.

In the above-mentioned information transmitter apparatus, the modulator means quadrature-amplitude-modulates the respective-order carriers in accordance with input digital data signal, so that intensity signals, which are obtained in a plurality of intervals obtained by dividing a frame output signal of the video camera at equal intervals, become a predetermined set value.

In addition, in the above-mentioned information transmitter apparatus, the modulator means generates the modulated signal, so that a position of a triangular wave peak, which is determined by the intensity signal obtained in the plurality of intervals obtained by dividing the frame output signal at equal intervals, is changed.

Further, in the above-mentioned information transmitter apparatus, the modulator means modulates the respective-order carriers excluding predetermined low-order carriers.

According to the second aspect of the present invention, there is provided an information receiver apparatus for use in an information transmission system. The information transmission system includes an information transmitter apparatus and the information receiver apparatus. The information transmitter apparatus transmits a surface-shaped visible light signal using a surface light source, where the visible light signal is modulated according to a modulated signal modulated using a plurality of respective-order carriers different from each other, and the respective-order carriers have a fundamental frequency and multiple frequencies of a frame frequency waveform of a video camera of rolling shutter type provided in the information receiver apparatus. The information receiver apparatus receives the visible light signal using the video camera. The information receiver apparatus includes demodulator means that Fourier-transforms a frame output signal of the visible light signal outputted from the video camera, and quadrature-amplitude-demodulates Fourier-transformed frame output signals to generate a digital data signal.

In the above-mentioned information receiver apparatus, the demodulator means multiplies the frame output signal of the visible light signal by a deconvolution of a Fourier transform of a transfer function of an obstacle existing between the information transmitter apparatus and the information receiver apparatus to remove information on the obstacle.

In addition, in the above-mentioned information receiver apparatus, the information receiver apparatus adjusts an operation timing between the information transmitter apparatus and the information receiver apparatus by correcting an operation timing of the video camera using a synchronization signal included in the visible light signal.

Further, in the above-mentioned information receiver apparatus, the information receiver apparatus includes a plurality of the demodulator means, and synchronizes operations of the plurality of demodulator means with each other using the synchronization signal.

According to the third aspect of the present invention, there is provided an information transmission system including the information transmitter apparatus, and the information receiver apparatus.

In the above-mentioned information transmission system, the modulator means modulates the carrier for a specific information receiver apparatus, using a harmonic of a carrier order corresponding to the specific information receiver apparatus, and the demodulator means selectively demodulates the digital data signal only in the specific information receiver apparatus by setting a predetermined exposure time ratio corresponding to the carrier order in the video camera.

In addition, in the above-mentioned information transmission system, the information transmitter apparatus includes: data divider means that dividing the digital data signal into a plurality of digital data signals corresponding to a plurality of divided screens when the screen to be transmitted is divided into the plurality of divided screens; a plurality of the modulator means that modulates the carrier into a plurality of the modulated signals in accordance with the divided digital data signals; and a plurality of the surface light sources driven according to the plurality of modulated signals. The information receiver apparatus includes: a plurality of the demodulator means that demodulate respective digital data signals corresponding to the plurality of divided screens; and combiner means that combines the digital data signals from the plurality of the demodulator means into one digital data signal.

Further, in the above-mentioned information transmission system, the information transmitter apparatus includes: data divider means that divides the digital data signal into a plurality of digital data signals corresponding to a plurality of color information when the screen to be transmitted is divided into the plurality of color information; a plurality of the modulator means that modulates a carrier into a plurality of the modulated signals in accordance with the respective divided digital data signals; and a plurality of the surface light sources respectively driven by the plurality of corresponding color information according to the plurality of modulated signals. The information receiver apparatus includes: a plurality of the demodulator means that demodulates the respective digital data signals corresponding to the plurality of color information; and combiner means that combines the digital data signals from the plurality of demodulator means into one digital data signal.

According to the fourth aspect of the present invention, there is provided a program executed by a computer, where the program is provided for an information receiver apparatus for use in an information transmission system. The information transmission system includes an information transmitter apparatus and an information receiver apparatus. The information transmitter apparatus that transmits a surface-shaped visible light signal using a surface light source, where the visible light signal being modulated according to a modulated signal modulated using a plurality of respective-order carriers different from each other, and the respective-order carriers have a fundamental frequency and multiple frequencies of a frame frequency waveform of a video camera of rolling shutter type provided in the information receiver apparatus. The information receiver apparatus that receives the visible light signal using the video camera. The program includes a step of, by the information receiver apparatus, Fourier-transforming a frame output signal of the visible light signal outputted from the video camera, and quadrature-amplitude-demodulating Fourier-transformed frame output signals to generate a digital data signal.

In the above-mentioned program, the information receiver apparatus is electronic equipment.

Effect of the Invention

According to the information transmission system of the present invention, visible optical communication can be performed at a higher rate than in the prior art. In addition, the present invention can provide an information transmitter apparatus, an information receiver apparatus, and a program each for the information transmission system.

BEST MODE FOR CARRYING OUT THE INVENTION

Figure 1:
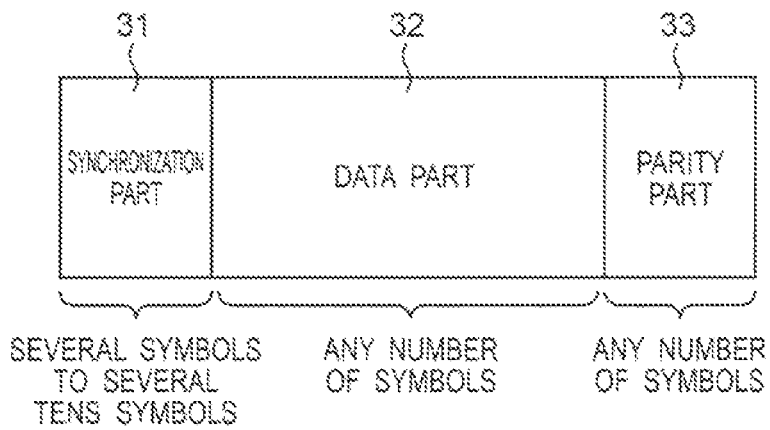
FIG. 1 is a diagram illustrating an example of a packet configuration used in an information transmission system according to an embodiment.

Embodiments according to the present invention will be described below with reference to the drawings. In addition, in each following embodiment, the same symbols are used for the same or similar components.

Outline of Embodiments According to the Invention

The present invention relates to an optical communication technique typically used for visible optical communications using high rate light emitting elements such as light emitting diodes (hereinafter, referred to as LED) and a video camera of rolling shutter type. The present invention can realize information transmission at a rate in excess of several hundred times of the photographic frame rate by utilizing a video camera, which is built in a portable information terminal such as a smartphone, for signal detection. LEDs have been widely used for a back light of a liquid crystal display apparatus, a digital signage, and a lighting device for automobile, and it is possible to modulate light at a high rate by an optical intensity modulation, and to emit surface-shaped light. In addition, a portable information terminal built in a video camera of rolling shutter type has been widely used. If optical information transmission that mainly transmits visible light by using both of the surface light source and the video camera is done, it is possible to apply for communications having such a feature, which is not in radio wave wireless communications, assuming reality as a communication system only within a line-of-sight distance.

For such applications, there is an example that realizes communications at several Mbps or higher using dedicated light emitting element for high rate communications and a camera of high speed frame rate. However, the frame rate of a commercial video camera incorporated into commercial mobile equipment such as smartphone is about 30 to 60 frame/second (30 to 60 fps), and in the case of using the same video camera, there is only an example of communication at several kbps even utilizing the surface light emitting and the light receiving of rolling shutter type. In other words, the applications for visible optical communications are limited mainly due to communication rate limitations.

On the other hand, such video cameras are used at a low rate for communications but have been widely used. Therefore, if the video cameras can transmit data for communications at a higher speed bit rate than that of the conventional examples, it is expected that the visible optical communications will be widely used in the field of civil life. Specifically, information transmission from apparatuses such as a liquid crystal display apparatus, an emitting poster, and a digital signage (bulletin board) and inter-vehicle communications using automotive lighting device will be widely used.

Embodiments according to the present invention relate to a visible optical communication using a low-speed commercially available video camera. For example, use of a camera of rolling shutter type having 60 fps results in communications at a bit rate of 20 kbps or higher by using illumination device for communications of surface light emitting type.

Conventionally, by using a surface light source and a camera of rolling shutter type, there are inventive examples and embodiments, that was carried out relatively fast visible optical communications. In the shooting parameters of the video cameras, there is an optical integration time per photographic frame, which is called as electronic shutter. If the exposure time ratio is set to a small value (namely, the optical integration time per frame is set to a small value), it is possible to clearly photograph fast moving object, and therefore, it can be used for such specific photographing. In the visible optical communications using a light source for surface light emitting communications and a video camera of rolling shutter type, there was such a technique that the communications are done by using the characteristics, setting the exposure time ratio to a small value such as several percent or less upon reception of communications, and detecting a high speed change in a light signal as a clearly bright and dark line pattern.

However, the exposure time ratio is set to a small value, resulting in such a disadvantage that the noise in the image increases, and also the resulting image becomes dark. Therefore, in general photographing, the exposure time ratio is usually set to a large value such as a value close to 100%. If the exposure time ratio is set to a small value for communications, then this results in such a drawback that it is incompatible with the camera setting conditions for general photographing.

In contrast, the embodiment of the present invention adapts the detection algorithm for each exposure time ratio and corrects the information. Thus, in the normal photographing, high rate communications can be done with selecting optimum parameters to include a region of the exposure time ratio of a value close to 100%, and the embodiment has such a feature that high sensitive visible optical communications can be done with almost no noise.

In the embodiments of the present invention, the light source of surface light emitting is used which is synchronized with the frame rate of the video camera. Such conventional method uses the video camera having the electronic exposure time ratio (hereinafter, referred to as an exposure time ratio), which is set to a small value. The present method can utilize the video camera having an exposure time ratio, which is even set to either a small value or a large value such as 100%. Since the present method can be done in the same conditions as that of the normal photographing operation, the range of the applications to the visible optical communications can be extended. Since the region having the exposure time ratio of a large value can be used, the signal to noise ratio of the light receiving element of the video camera can be improved. In addition, since the visible optical communications can be used with the same video camera set in the normal photographing state, the use opportunities can be broadened.

Since in the known method a high-speed signal (high-speed modulated) is received, in particular, a small exposure time ratio is set such as η=0.02 to 0.03 or less. In contrast, the embodiments of the present invention predicts waveform deformation due to the exposure time ratio, and performs code matching, resulting in enabling the reception of high-speed signal even with a large exposure time ratio. Further, since the frequency range of the sine wave harmonics received in accordance with the exposure time ratio is changed, the exposure time ratios for respective ones of the plurality of real receiver apparatuses are set separately to be different from each other, and then, it is also possible to apply to perform communications in which the receiver apparatuses or the recipients are separated at the same time.

According to the communication method of the prior art having an exposure time ratio of a small value, the photographing screen is ideal to be a binary contrast, and we had set the exposure time ratio to easily obtain the ideal conditions. However, actually, since in the analysis described later the frequency range supported is limited by the camera, brightness patterns are taken over inevitably appear intermediate brightness at the boundary of the emission. The known proposed method has no special meaning in the intermediate brightness area, and the information on the intermediate brightness area is discarded at the time of reception. According to the present invention, it is assumed in advance that the video imaged by the camera is subject to a certain modification in the frequency domain due to the operation of the image sensor, and adaptive modulation is performed in consideration of this, and the image is captured with intermediate brightness. We have developed a method that can achieve high-speed and high-quality communication by reducing the amount of information discarded by communicating using all of the captured image information obtained, including the part photographed at the intermediate brightness.

The method of the present invention that sets the optimum parameters for communications including the exposure time ratio can not only efficiently accelerate the communication rate, but also can include various kinds of functions such as the communications to select recipients, reductions of the impacts by the obstacles, and reduction of flickers in the modulated signal.

Description of Method of Embodiment of the Invention

First of all, the photographing time for one frame of the video camera is set to $T_p$ seconds. The reciprocal thereof is the video frame rate $f_p$, and a relationship of $f_p=1/T_p$ is held. Many commercially available digital video cameras, or digital video cameras of smartphones adopt a video frame rate of $f_p=60$ (60 frame/second).

The moving video light receiving element typified by the CMOS method has been widely adopted in these cameras, however, it is necessary to line-scan by the rolling shutter, and it is just feature of the moving video light receiving element. In this line scan method, about 1080 scanning lines are photographed from the top to the bottom while shifting the light receiving start time at a constant rate. When the scanning line of interest is the n-th line from the top scan line and the total number of scanning lines is N, the scan for that scanning line is started typically with a delay of a time interval of $(n/N)T_p$ (where n=0, 1, 2, ..., N−1).

When the surface-shaped emitting light whose brightness or luminance changes at a rate in the excess of the frame period is received by the video camera of rolling shutter type, each of the frames is photographed generally with a horizontal stripe pattern having changing gray-scale (light and shade pattern). When the signals of the strip pattern is spatially-Fourier-transformed, a higher harmonic sequence can be obtained to have a fundamental harmonic of the frame rate $f_p$ and higher harmonics arranged at interval frequencies of the video frame rate fp. If the respective higher harmonics can be photographed by using quadrature amplitude modulation (hereinafter, referred to as QAM modulation) including amplitude modulation and phase modulation, digital communications similar to OFDM (orthogonal frequency multiplex modulation) with radio waves becomes possible. Hereinafter, a surface light source modulation method for photographing such a striped pattern will be described.

Transmittion Waveform

The sender uses the information transmitter apparatus 1 to drive the LEDs of the surface light source in accordance with a modulation waveform, to thereby emit light by using the time $T_p$ as a basic time unit. In this case, the modulated signal is b(t). The modulated signal b(t) has a basic time unit of $T_p$. Therefore, if it is assumed to be repeated in this period, the modulated signal b(t) can be expanded to a sequence of complex Fourier coefficients $\beta_k$, where k is the subscript of an integer, and k=0, ±1, ±2, ..... By the following equation (1), the modulated signal b(t) can be transformed to Fourier coefficients $\beta_k$ having a fundamental frequency of $f_p=1/T_p$. In this case, the modulated signal b(t) is a signal modulated using a plurality of respective-order carriers different from each other, where the respective-order carriers include:

(a) the fundamental frequency of the waveform of the frame frequency (of the frame output signal) of the video camera of rolling shutter type of the information receiver apparatus 2; and (b) multiple frequencies of the fundamental frequency.

$$\beta_k = \int_0^{T_p} b(t) e^{-j2\pi kt/T_p} dt \qquad (1).$$

Conversely, the complex Fourier coefficients $\beta_k$ can be inversely-transformed to the time waveform b(t) of the modulated signal by the following inverse Fourier transformation:

$$b(t) = \sum_{k=-K}^{K} \beta_k e^{j2\pi kt/T_p}. \qquad (2)$$

In equation (2), ±K theoretically corresponds to a range of ±∞, and can usually be finite values as the highest frequency included in the modulated signal b(t).

Received Signal Characteristics

The recipient receives the surface light emitting signal including the modulated signal from the information transmitter apparatus by the video camera (having an exposure time ratio η) having a frame rate of $f_p=1/T_p$, which is installed in the information receiver apparatus. The light receiving element does not take in the received light signal over the entire period $T_p$, and integrates the electric signals from the photoelectric conversion elements only for a time interval $\eta T_p$, which can be expressed using the exposure time ratio η (0<η<1) within a predetermined time interval range. The information receiver apparatus performs (a) light receiving and (b) analog to digital conversion (hereinafter, referred to AD conversion) and data transmission, alternately. Therefore, the exposure time ratio cannot be one but can be set to the maximum value such as about a value close to 0.99 (99%). If the exposure time ratio η is set to a value close to one, the noise of the photographing elements can be reduced, and the photographic sensitivity can be improved. Therefore, in the case of normal photographing, the video camera is operated with an exposure time ratio η of a value close to one. On the other hand, if you wish to clearly photograph a subject moving at a high speed, the exposure time ratio η should be a smaller value. Therefore, many video cameras have been made so that the user can set the exposure time value η to various values according to the photographing conditions, and the video cameras can be used with an appropriate exposure time ratio each time of photographing.

The received signal is subjected to the following two types of modifications, ignoring the intensity change caused by the distance and the optical system, or the superimposition of noise caused by the ambient light and the light receiving element.

(1) Since the light receiving element integrates the light from the light source for the time of $0 \leq t \leq \eta T_p$, the received waveform changes in the reception signal as compared to the transmission waveform.

(2) An integration result signal is AD converted each time of the video frame period $T_p$, and the AD converted signal is outputted as a discrete signal. The video frame rate $f_p$ which is the reciprocal of the video frame period $T_p$ can be regarded as a sampling frequency of the signal change.

The embodiment according to the present invention is characterized in that the influence of both is accurately tracked and signal detection is performed while correcting the influence. The correction of both will be described in detail later.

Correction of Signal Change by Integration Operation

The light receiving elements of the video camera can be considered to integrate the waveform $b(t+\delta T_p+(n/N)T_p)$ with a time width of $0 \leq t \leq \eta T_p$. Cutting out and integrating the signal for the above-mentioned time width means mathematically nothing more than convolution by multiplying the signal waveform by a rectangular window having the time width $\eta T_p$. In this case, $0 \leq \delta \leq 1$ is a start time difference between the transmission signal and the receiving video camera operation, that is, an operation phase difference, and it takes a positive value when the video camera is slightly delayed. If some synchronization mechanism is placed between the light source and the video camera operation, δ=0 can be obtained. Otherwise, the difference δ of non-zero exists. In addition, $(n/N)T_p$ is the delay of the photographing timing at the n-th scanning line by the rolling shutter.

The video camera integrates the signal $b(t+\delta T_p+(n/N)T_p$ for a time interval of $0 \leq t \leq \eta T_p$, and outputs the integrated signal as the n-th line signal from the imaging element. It is noted that the integrated signal is complex-Fourier-transformed with focus attention to "t", and then, the k-order Fourier coefficient $B_k$ is expressed by the following equation:

$$B_k = A\eta e^{j2\pi k(\delta+n/N)} e^{j\pi k\eta} \text{sinc}(\pi k\eta) \beta_k \quad (3),$$

where A is a coefficient of signal transmission between transmission and reception, and is determined by the light emission efficiency of the modulation light source, the sensitivity of the image sensor, the F value of the lens, and the like. In the following, these are ignored as A=1.

The right side of the equation (3) means the convolution of a rectangular window having a time width $\eta T_p$ for each of the scanning line when the integration operation of the imaging elements of the video camera is performed by the rolling shutter. It is understood that the right side of the equation (3) means the signal of the multiplication results of the following:

(1) the term $\eta e^{j\pi k\eta} \text{sinc}(\pi k\eta)$, which is obtained by Fourier-transforming the time width, and the Fourier series $\beta_k$ of the original waveform, in the Fourier-transformed equation; and (2) the delay factor $e^{j2\pi k\eta(\delta+n/N)}$ including the delay $\delta T_p$ between the timing of the signal source and shutter timing, and the delay $(n/N)T_p$ due to the operation of the rolling shutter. Assuming that the light source and the video camera are synchronized with each other, the delay coefficient δ=0, and focusing on the first (or top) scanning line n=0, this equation can be simplified as the following equation:

$$B_k = \eta e^{j\pi k\eta} \text{sinc}(\pi k\eta) \beta_k \quad (4).$$

The problem of the operating phase between the light source and the video camera is the presence or absence of the delay coefficient δ, and there is no significant difference in the mathematical equation. Therefore, for the sake of simplicity in the following discussion, it is assumed that δ=0 holds. The consideration of the other case will be described later in detail.

By using the Fourier coefficient $B_k$ corresponding to the first (or top) scanning line, the time waveform B(t) of the modulated signal can be reconstructed by the following inverse Fourier transformation:

$$B(t) = \sum_{k=-K}^{K} B_k e^{j2\pi kt/T_p} \quad (5).$$

The luminance In, which is photographed on the n-th scanning line (n=0, 1, 2, . . . , N−1), becomes $B((n/N)T_p)$, which the value of time function B(t) in the case of t=(n/N)$T_p$ due to the time delay of the shutter, and therefore, the following equation can be obtained:

$$I_n = B((n/N)Tp) = \sum_{k=-K}^{K} B_k e^{j2\pi k((n/N)Tp)Tp} = \sum_{k=-K}^{K} B_k e^{j2\pi kn/N} \quad (6).$$

The equation (6) represents that the frames consisting of N scanning lines obtained by the rolling shutter is obtained by discrete-special-inverse-Fourier-transforming the Fourier coefficients $B_k$. By discrete-special-Fourier-transforming the gray-scale changing pattern (light and shade pattern) image $I=(I_0, I_1, \ldots, I_{N-1})^T$ of the entire screen, the Fourier coefficients $B=(B_0, B_1, \ldots, B_{N-1})T$ can be obtained with B=FFT [I]. $B_{N/2}, B_{N/2+1}, \ldots, B_{N-1}$ can be appropriately replaced with the Fourier coefficients having negative suffixes by using the correspondence of $B_{-1}=B_{N-1}, B_{-2}=B_{N-2}$. In this case, at the maximum frequency K<N/2 of the signal, the coefficients obtained by special Fourier transformation are matched to the Fourier coefficients of time function.

Maximum Communication Rate

The Fourier coefficient $B_k$ is a complex value, and the amplitude and the phase thereof can be set to any value by the modulated signal b(t) which is combined by taking the equation (4) into consideration. This is equivalent to the OFDM communication for use in wireless communications. The Fourier coefficient $B_k$ is regarded as carriers equally spaced on the frequency axis, and the carrier signal is QAM-modulated, so that information data can be transmitted. For example, by using a 256-QAM modulation, the symbols of q=8 bits per one Fourier efficient $B_k$ can be transmitted. When using the video camera having N total scanning lines, the Fourier coefficients $B_k$ of the carrier order k=0, ±1, ±2, . . . , ±[N/2] can be obtained. In this case, [N/2] means an integer not exceeding two, and if N is an even number, [N/2] is equal to N/2. k=0 denotes a direct current component, which is the average luminance (real number) of the screen.

Since the light emitting element cannot take a negative light emission value, generally, lighting of a DC component is added to control the modulated light so as to stay in the positive range. In this case, it is not normally used for communications carrying information. $B_N/2$ with an even number N is a Nyquist frequency component, which is also a real value and has only an amplitude. This is also not subject to QAM modulation. Also, $B_{-k}=\overline{B_k}$ (Complex conjugate). Considering these properties, the maximum communication rate of the present method is approximately $([(N-1)/2]-1)qf_p$ (bit/second).

Effective Communication Rate

According to the equation (5), the amplitude of the Fourier coefficient $B_k$ is subjected to attenuation of $|\eta \operatorname{sinc}(\pi k \eta)|$. This term represents decrease of $\eta \times (1/k\eta) \approx \eta/k$. At a large carrier order k, the Fourier coefficient $B_k$ becomes difficult to use the communications due to the attenuation thereof. For example, assuming that the carrier having the carrier order k=1, 2, 3, . . . , 50 is used for communications, the communication rate, which can be obtained by the communications of the bit number q=8 bits per symbol and the video frame rate $f_p$=60 frame/second, is 50×8×60=24,000 bit/second.

Attenuation Correction and Error Correction

Since it has been found out that the amount of attenuation of the Fourier coefficient $B_k$ is $|\eta \operatorname{sinc}(\pi k \eta)|\eta$, the harmonics of higher order can be used for communications by emphasizing the harmonics of the original light emitting signal b(t) so as to compensate attenuation in the same components. However, it is accompanied by an overall increase in the amplitude of the modulated signal b(t). The maximum amplitude of the modulated signal b(t) cannot exceed the maximum luminance $b_{max}$ that can be generated by the light emitting element. Further, since it is impossible to generate a negative modulated signal b(t) in the visible optical communication, the DC component $\beta_0$ of the brightness should be used as a bias, and it should be used so that the amplitude range of the modulated signal is $0 \leq b(t) \leq b_{max}$. If the modulated signal b(t) has a portion exceeding this range, the portion cannot be decoded normally, resulting in a communication bit error. This can be alleviated to some extent by adding an error correction code to the communication text. However, upon transmitting the light emitting signal with previously emphasizing the Fourier coefficient $B_k$ of the higher order in order to compensate for the attenuation of the Fourier coefficients $\beta_k$, the light emitting signal should be transmitted under such a condition of $0 \leq b(t) \leq b_{max}$ in in mind, and with taking in consideration of the combination with error correction codes.

Communication Method

When photographing the light emitting signal (modulated signal) b(t) from the surface light source, which is modulated with a fundamental period $T_p$, the Fourier coefficient of the light emitting signal photographed as the frame signal of the video camera of rolling shutter type is $B((n/N)T_p)$ for each scanning line. Thus, it is understood that the Fourier coefficient $B((n/N)T_p)$ is one-dimension discrete special Fourier-transformed to obtain the Fourier coefficient $B_k$. The respective values of the Fourier coefficient $B_k$ have the relationship of the equation (4) with the Fourier coefficient $\beta_k$ of the original modulated signal b(t). Taking this into consideration, the light emitting modulated signal b(t) is designed and generated, and then, it is received by the video camera. Thereafter, the photographed frame signal is discrete-special-Fourier-transformed to obtain the Fourier coefficients $B_k$. Next, the detailed method will be described.

Information Transmission System Using Modulation and Demodulation Methods

Figure 2A:
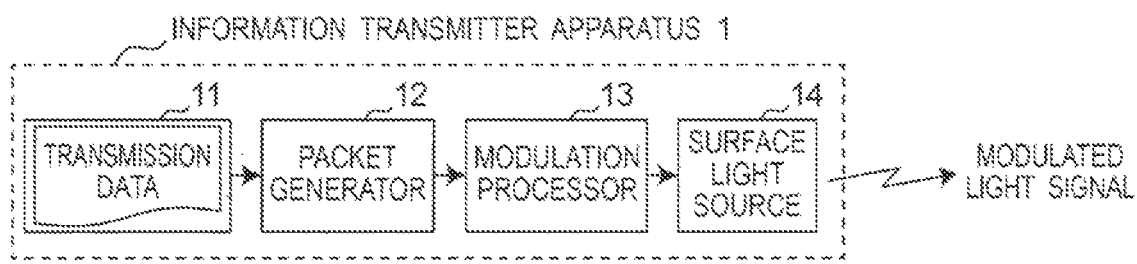
FIG. 2A is a block diagram illustrating a configuration example of an information transmitter apparatus 1 of the information transmission system according to the embodiment.
Figure 2B:
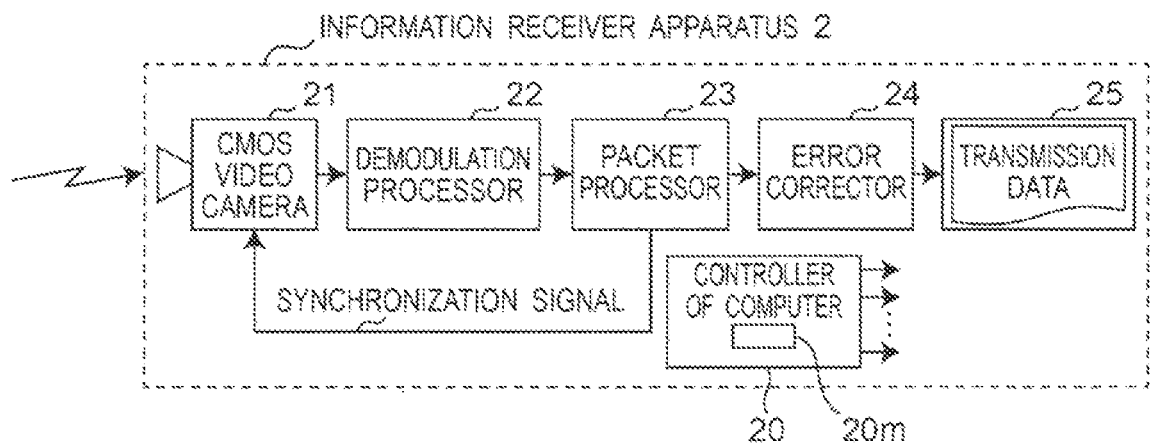
FIG. 2B is a block diagram illustrating a configuration example of an information receiver apparatus 2 of the information transmission system according to the embodiment.

FIG. 1 is a diagram illustrating an example of a packet configuration used in the information transmission system according to the embodiment. FIG. 2A is a block diagram illustrating a configuration example of an information transmitter apparatus 1 of the information transmission system according to the embodiment, and FIG. 2B is a block diagram illustrating a configuration example of an information receiver apparatus 2 of the information transmission system according to the embodiment.

In the packet configuration example shown FIG. 1, one packet is configured to include a synchronization part 31, a data part 32, and a parity part 33. In visible optical communication using the modulation and demodulation method according to the present embodiment, the light emitting waveform (modulated signal) b(t) is preferably synchronized with the photographing timing of the CMOS video camera 21, that is, it is preferable that the delay coefficient $\delta$=0 in the equation (2). The synchronization part 31 of FIG. 1 is used to perform the above-mentioned control, and the information transmitter apparatus 1 generates a light emitting signal consisting of known spectral coefficients $\beta_k$ for a time interval of several frames. The transmitted light emitting signal is received and Fourier-transformed, and then, in the case of a synchronization deviation, namely, in the case of the delay coefficient $\delta \neq 0$, the phase change is added in the relationship of the equation (4) with respect to the Fourier coefficient $B_k$ to obtain $A B_k e^{j2\pi k\delta}$. In this case, A is the amplitude determined by the sensitivity characteristic of the transmitter and receiver apparatus. From this, the phase difference (delayed phase difference) $\delta$ between transmission and reception is obtained using the synchronization part, and the normalized coefficient 1/A of the received signal strength is determined. Recently, many CMOS cameras correct the shutter timing upon photographing to control the timing delay factor $\delta$ to be zero. However, the synchronization part has preferably a length corresponding to sufficient time required for the control.

Referring to FIG. 1, the data part 32 is a message of digital data, which is transmitted in the visible optical communications. For example, when the message is 256-QAM modulated, it can be transmitted by eight bits of one symbol for each one harmonic. When a plurality of h harmonics is used, the message of 8 h bits can be transmitted. Therefore, the information of L=8 hm bits is disassembled, and can be transmitted by a plurality of m frames of the video signal. In this case, the following two modulation and demodulation methods A and B (hereinafter referred to as methods A and B) are considered.

(Method A) In the symbol modulation method, the symbols are modulated so that the modulated signal includes a spectrum having k-order Fourier coefficients $B_k$ by a modulation method such as 256-QAM, and then, the following spectral coefficients:

$$\beta_k = (e^{j\pi k\eta}\mathrm{sinc}(\pi k\eta))^{-1}B_k \qquad (7).$$

may be generated as receiving results at the receiver side. In this case, the exposure time ratio η upon receiving is specified in advance at the time of transmitting.

(Method B) The spectral coefficients $\beta_k$ are made to correspond to the modulated signal such as that modulated by a modulation method such as 256-QAM, and the received Fourier coefficients $B_k$ may be transformed and interpreted into the spectral coefficients $\beta_k$ by the equation (7). In this case, the exposure time ratio η upon receiving can be selected freely to some extent.

The method A is a method in which the rotation and/or attenuation of higher-order terms of the harmonics upon receiving are estimated in advance, and the spectral coefficients $B_k$ are inversely corrected in advance by a method such as enhancement and then transmitted. Although the details will be described later, first of all, the information transmission system that communicates by using the method B will be described.

In FIG. 1, a parity part 33 is known information that is supplemented to detect or correct errors caused due to noise or the like.

As shown in FIGS. 2A and 2B, the information transmission system for use in visible optical communications is configured to include the information transmitter apparatus 1 and the information receiver apparatus 2.

Referring to FIG. 2A, the information transmitter apparatus 1 includes a memory 11, a packet generator 12, a modulation processor 13, and a surface light source 14. For example, transmission data (digital data signal of message data) stored in the memory 11 is inputted to the packet generator 12. The packet generator 12 generates packet data configured as shown in FIG. 1, and outputs the packet data to the modulation processor 13. In accordance with the input packet data, the modulation processor 13 intensity-modulates respective-order carriers different from each other, having a fundamental frequency and its multiple frequencies of the waveform of frame frequency of the frame output signal from the video camera 21 of rolling shutter type of the information receiver apparatus 2, and it is OFDM-modulated as described in detailed below. Thereafter, the modulated signals drive the surface light source 14, which is configured by either a light source that diffuses emitting light from a single LED, or a light source that is configured so that a plurality of LEDs is arranged in juxtaposition in a lattice shape. In this case, the plurality of LEDs is connected in series or in parallel to emit the light with the same signal waveform. Then a surface-shaped modulated light signal is emitted from the surface light source 14.

Referring to FIG. 2B, the information receiver apparatus 2 is configured to include the CMOS video camera 21, a demodulation processor 22, a packet processor 23, an error corrector 24, a display 25, and a controller 20 that is configured to control the operations of these processors 21 to 25. The CMOS video camera 21 receives the emitted modulated optical signal having the surface shape using the synchronization signal inputted from the packet processor 23, photo-electrically converts the modulated signal into an electrical signal, and outputs the same electrical signal to the demodulation processor 22. The demodulation processor 22 demodulates an input electrical signal as described in detail later to obtain and output a data signal to the packet processor 23. The packet processor 23 separates from an input data signal to respective pieces of data of the synchronization part 31, the data part 32, and the parity part 33, regenerates and outputs a synchronization signal to the CMOS video camera 21, and outputs respective pieces of data of the data part 32 and the parity part 33 to the error corrector 24. Based on the data of the parity part 33, the error corrector 24 performs error correction on the data of the data part 32 to generate and output message data after the error correction to, for example, the display 25 so that the output message is displayed on the display 25.

In the information receiver apparatus 2 of FIG. 2B, the processing of the demodulation processor 22, the packet processor 23 and the error corrector 24 may be performed using programs by the controller 20 which is configured by a computer. At this time, the controller 20 incorporates a program memory 20m for storing the same program.

Detailed Configuration of Received Signal and Information Receiver Apparatus

Figure 3A:
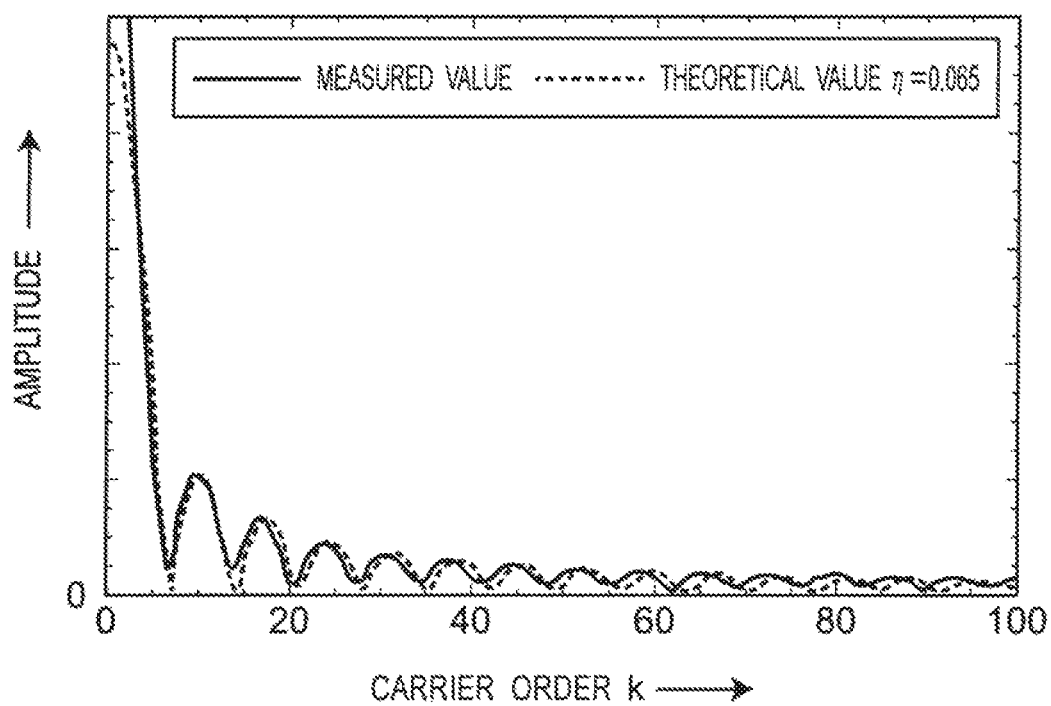
FIG. 3A is a graph showing amplitude characteristics with respect to a carrier order k used in the information transmission system.
Figure 3B:
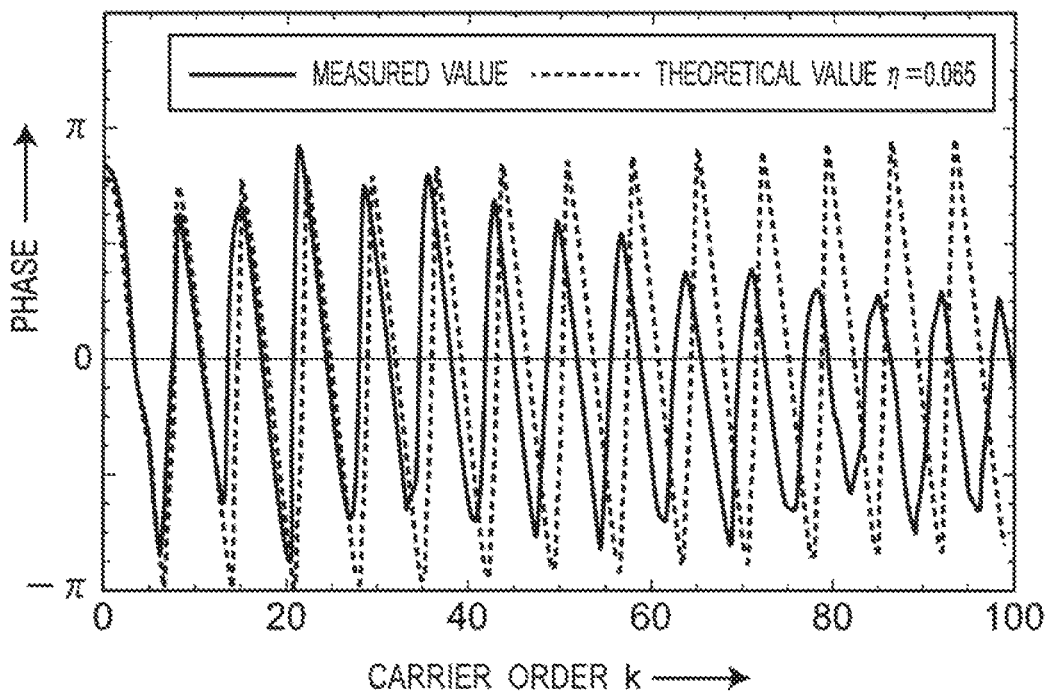
FIG. 3B is a graph showing phase characteristics with respect to a carrier order k used in the information transmission system.

FIG. 3A is a graph showing amplitude characteristics with respect to the carrier order k used in the information transmission system, and FIG. 3B is a graph showing phase characteristics with respect to the carrier order k used in the information transmission system. In this case, FIGS. 3A and 3B show such an example that, the carrier is intensity-modulated according to symbols having a constant amplitude to obtain spectral coefficients $\beta_k$, and the carriers having carrier orders k=0 to 100 are transmitted in a form of OFDM; and then, the carriers are received by the CMOS video camera 21 having the exposure time ratio η=0.065. As apparent from FIGS. 3A and 3B, the attenuation sinc(πkη) and the phase rotation $e^{j\pi k\eta}$ for respective carrier orders k which correspond to the equation (4) can be seen in the received Fourier coefficients $B_k$.

Figure 4:
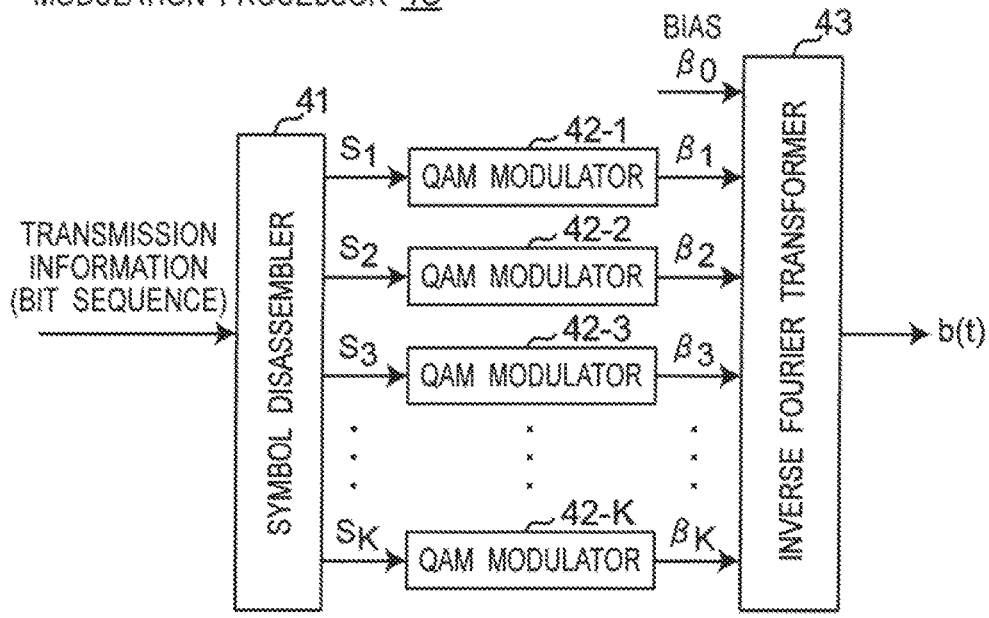
FIG. 4 is a block diagram illustrating a configuration example of a modulation processor 13 of FIG. 2A.
Figure 5:
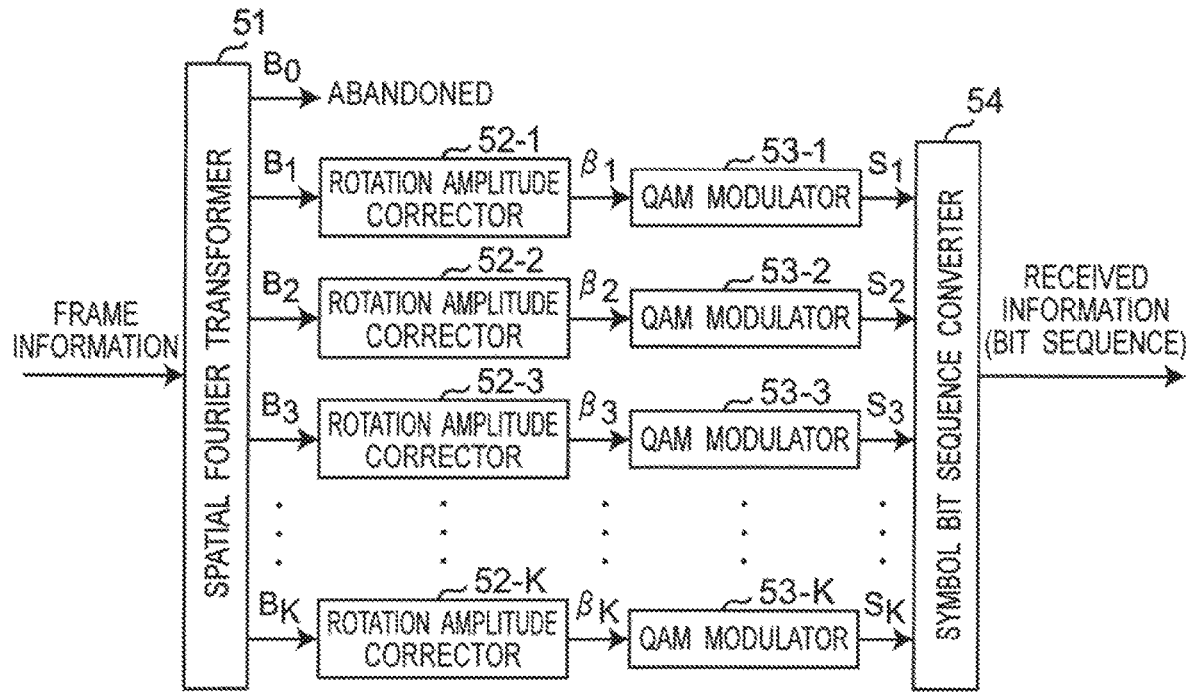
FIG. 5 is a block diagram illustrating a configuration example of a demodulation processor 22 of FIG. 2B.

FIG. 4 is a block diagram illustrating a configuration example of the modulation processor 13 of FIG. 2A, and FIG. 5 is a block diagram illustrating a configuration example of the demodulation processor 22 of FIG. 2B. In this case, the modulation processor 13 of the information transmitter apparatus 1 and the demodulation processor 22 of the information receiver apparatus 2 which are made by the method B are shown in FIGS. 4 and 5.

The modulation processor 13 of FIG. 4 is configured to include a symbol disassembler 41, a plurality of K QAM modulators 42-1 to 42-K, and an inverse Fourier transformer 43. In FIG. 4, the symbol disassembler 41 disassembles transmission information data (bit sequence) inputted from the packet generator 12 into respective symbols $S_1$ to $S_K$, and outputs the symbols $S_1$ to $S_K$ to the corresponding QAM modulator 42-1 to 42-K, respectively. The QAM modulators 42-1 to 42-K QAM-modulates the carrier in accordance with the input respective symbols $S_1$ to $S_K$, respectively, to obtain and output spectral coefficients $\beta_1$ to $\beta_K$ to the inverse Fourier transformer 43. The inverse Fourier transformer 43 performs inverse Fourier transformation on a plurality of K spectral coefficients $\beta_1$ to $\beta_K$ inputted therefrom to generate and output a modulated signal b(t) to the modulation processor 13.

The demodulation processor 22 of FIG. 5 is configured to include a special Fourier transformer 51, a plurality of K rotation amplitude correctors 52-1 to 52-K, a plurality of K QAM demodulators 53-1 to 53-K, and a symbol bit sequence converter 54.

Referring to FIG. 5, the special Fourier transformer 51 performs special Fourier transformation on the frame information data included in the electrical signal inputted from the CMOS video camera 21 to calculate respective Fourier coefficients $B_0$ to $B_K$. In this case, the Fourier coefficient $B_0$ of DC component is abandoned or rejected without using the Fourier coefficient $B_0$. The remaining Fourier coefficients $B_1$ to $B_K$ are inputted to the rotation amplitude correctors 52-1 to 52-K, respectively. The rotation amplitude correctors 52-1 to 52-K perform amplitude correction on the input Fourier coefficients $B_k$ $(k=1, 2, \ldots, K)$, respectively, with phase rotations corresponding to the respective Fourier coefficients to calculate the spectral coefficients $\beta_1$ to $\beta_K$, and output the spectral coefficients $\beta_1$ to $\beta_K$ to the QAM demodulators 53-1 to 53-K. The QAM demodulators 53-1 to 53-K QAM demodulate respective input spectral coefficients $\beta_k$ (k=1, 2, \ldots, K) to generate corresponding symbols $S_1$ to $S_K$, and then, output them to the symbol bit sequence converter 54. The symbol bit sequence converter 54 parallel-serial-converts the input K symbols $S_1$ to $S_K$ to generate bit sequence data of received information corresponding to the bit sequence data of the transmission information, and then, outputs them to the packet processor 23.

Referring to FIG. 4, the description on the processing for the negative carrier order $\beta_{-k}=\overline{\beta_k}$ (complex conjugate) is omitted. However, the same processing is required in the actual inverse Fourier transformation, and the received information of bit sequence for the complex conjugate thereof can be generated by the above-mentioned equations based on the spectral coefficients $\beta_k$. The negative Fourier coefficient $-B_k$ can be obtained in the demodulation processor of FIG. 5, and they are abandoned or rejected since they do not include any specific information. In addition, the packet processor 23 of FIG. 2B takes out the spectral coefficients $\beta_1, \beta_2, \ldots$ of FIG. 5, and examines polarization angles thereof, and then, based on these polarization angles, the packet processor 23 generates a synchronization signal for controlling the shutter timing so that the delay factor $\delta=0$.

It is noted that the following processing may be done by the method A. The harmonics near the carrier of the carrier order k=30 are received to obtain the Fourier coefficients $B_k$ by the information receiver apparatus 2 having an exposure time ratio $\eta=0.05$, and the harmonics near the carrier of the carrier order k=20 are received to obtain the Fourier coefficients $B_k$ by the information receiver apparatus 2 having an exposure time ratio $\eta=0.067$. Namely, different data may be received depending on the exposure time ratio $\eta$, respectively, to distribute the received data. In other words, the configuration of the information transmitter apparatus 1 is the same, and among from a plurality of the information receiver apparatuses 2, the information receiver apparatus 2 for a certain recipient may extract a harmonic signal near a carrier order corresponding to one exposure time ratio which is selected from a plurality of exposure time ratios different from each other to configure a multiple data communication system having a privacy communication function as follows.

Figure 6:
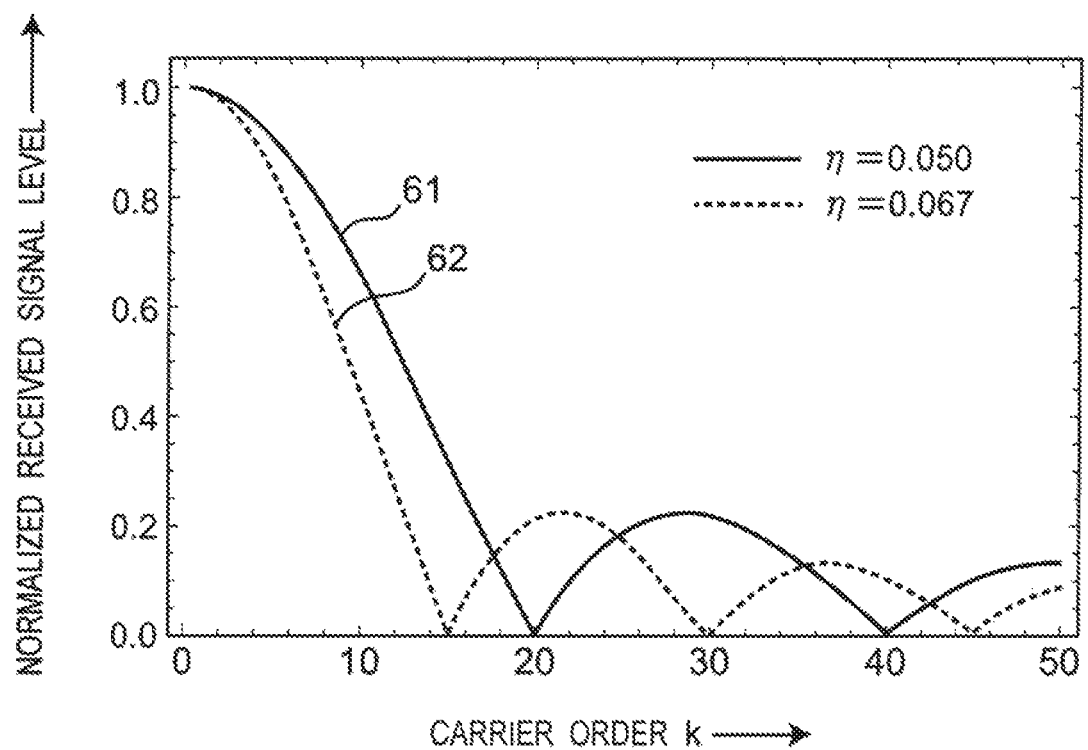
FIG. 6 is a graph showing normalized signal level characteristics with respect to the carrier order k received by a CMOS video camera 21 of the information transmission system.

FIG. 6 is a graph showing normalized signal level characteristics with respect to the carrier order k of the carrier received by the CMOS video camera 21 of the information transmission system. In this case, FIG. 6 shows the following:

(A) reception characteristics 61 with a carrier order k of the CMOS video camera 21 having a set exposure time ratio $\eta=0.050$; and (B) reception characteristics 62 with a carrier order k of the CMOS video camera 21 having a set exposure time ratio $\eta=0.068$.

As is apparent from FIG. 6, carrier orders k near $1 \le k \le 10$ also appear in the reception characteristics 61 and 62. The carrier in the vicinity of k=20 appears only in the reception characteristics 62, and does not appear in the reception characteristics 61. In addition, a carrier in the vicinity of k=30 appears only in the reception characteristics 61, and does not appear in the reception characteristics 62. From this property, the sender specifies exposure time ratios n in advance for respective recipients of the information receiver apparatus 2, and a broadcast communication text is transmitted with a carrier of a carrier order k near $1 \le k \le 10$. On the other hand, the following separate adjusted transmissions can be done as follows:

(a) a communication text which should be selectively transmitted is transmitted with a carrier order of k=30 to the information receiver apparatus 2 having the reception characteristics 61; and (b) another communication text which should be selectively transmitted is transmitted with a carrier order of k=20 to the information receiver apparatus 2 having the reception characteristics 62.

As described above, according to the method A, the attenuation degrees of respective carrier orders k are determined depending on the exposure time ratio of the information receiver apparatus 2 of the recipient. Therefore, the recipient can select the carrier order k of the harmonics to be received by adjusting the exposure time ratio of the information receiver apparatus 2 of himself. By utilizing this property, multiple data communications having a privacy communication function can be done for each of the recipients.

Drawing of Arbitrary Light and Shad Pattern
(Gray-Scale Changing Pattern)

When the exposure time ratio $\eta$ of the information receiver apparatus 2 is set to $\eta=0.01$, communications using about 50 carriers can be done. By utilizing this communications with the method A, the transmission waveform can be adjusted so that a modulated signal having an intended spectral form can be received up to about a range of carrier order of $0 \le k \le 50$ of the Fourier coefficients $B_k$. By arbitrarily adjusting the 50 spectrum when Fourier-transforming the photographing screen (or image), each of 100 intervals or parts obtained by equally dividing the photographing screen in a scanning direction can be set to an arbitrary brightness. In this case, in the case of a strip-shaped area configured by respective intervals or parts consisting of a plurality of scanning lines, the luminance of the center scanning line is set to the luminance of the interval. In the visible optical communications in which negative brightness cannot be transmitted, the direct current component $B_0$ is used as a bias to be applied to ensure that the modulated signal b(t)≥0, and cannot be freely set. The restriction on the direct current component $B_0$ means that the average luminance of the photographing screen cannot be arbitrarily controlled. In this sense, the luminance difference in the 100 intervals of the scanning line can be arbitrarily set.

When it is modulated in this way, the 100 scanning line intervals at equal intervals on the photographing screen appear with a luminance difference which is set in advance. By modulating the carrier so to put the information on the brightness of the scanning line at a particular position at the time of transmission, and by reading the value of the scanning line of the photographic screen directly, the present invention has such an advantageous effect that the transmission information can be demodulated without performing Fourier transform, The specific communication method according to this method is as follows. The method of the present invention requests the recipient (or the information receiver apparatus 2) to set the exposure time ratio η of the CMOS video camera 21 to, for example, η=0.01. This exposure time ratio η may be determined in advance, or this exposure time ratio η may be transmitted in their place in the communication system other than the visible optical communication. Alternately, this exposure time ratio η may be transmitted using a low-order carrier which can received with a relatively arbitrary exposure time ratio at the beginning portion of the visible optical communication. The communication text is disassembled into symbols of every 6 bits, and is converted into a luminance value sequence of 64 levels for 100 symbols. The columns of the luminance values are one-dimension-special-Fourier-transformed to obtain Fourier coefficients $B_k$ (−50≤k≤50). $B_{-50}=B_{50}$ (real number of Nyquist components). The respective-orders of harmonics are corrected by the method A to obtain spectral coefficients $\beta_k$, which are then inverse-Fourier-transformed to obtain a modulated signal b(t). Then the surface light source 14 is driven in accordance with the modulated signal b(t), so that a modulated optical signal is transmitted.

The recipients receives the same modulated signal b(t) using the CMOS video camera 21 of the information receiver apparatus 2 having a predetermined exposure time ratio η. The luminances in 100 intervals of the video frame obtained thus (the luminance on the center scanning line in the area in the case of the area including respective intervals consisting of a plurality of scanning lines) correspond to levels of 64 steps which is modulated by the above modulation method, and the luminances can be demodulated by quantizing and restoring them to symbols.

When the level of luminance as modulated into a plurality of Q steps, then the degree of freedom of difference in the steps is Q−1. Therefore, the communication bit rate obtained in this method is expressed by 100×1 g (Q−1) $f_p$ (where 1 g (x) is a logarithm to the basis 2). In the case of Q=16, a communication rate of about 23441 bit/second can be obtained by using the video camera having 16 frame/sec.

Next, the "optimum modulation method" in the information transmission system will be described below.

As mentioned above, the spectrum of −50≤k≤50 is set for the Fourier coefficients $B_k$, gray-scaled pattern or light and shade pattern having arbitrary 100 intervals can be drawn in the photographing screen by specifying an exposure time ratio η. Thus, there are the following methods for realizing communications using this method.

Among from the 100 intervals, attention is paid to four intervals SS0 to SS3, which can be taken arbitrarily on the screen, however, consecutive four intervals in the photographing frame are considered usually. In this case, the luminance information $u_0$, $u_1$, $u_2$, $u_3$ of the four intervals is obtained by sampling a triangular wave in each of the intervals SS0 to SS3 as shown in FIG. 7, where $v=u_0-u_2$, $w=u_1-u_3$.

Figure 7:
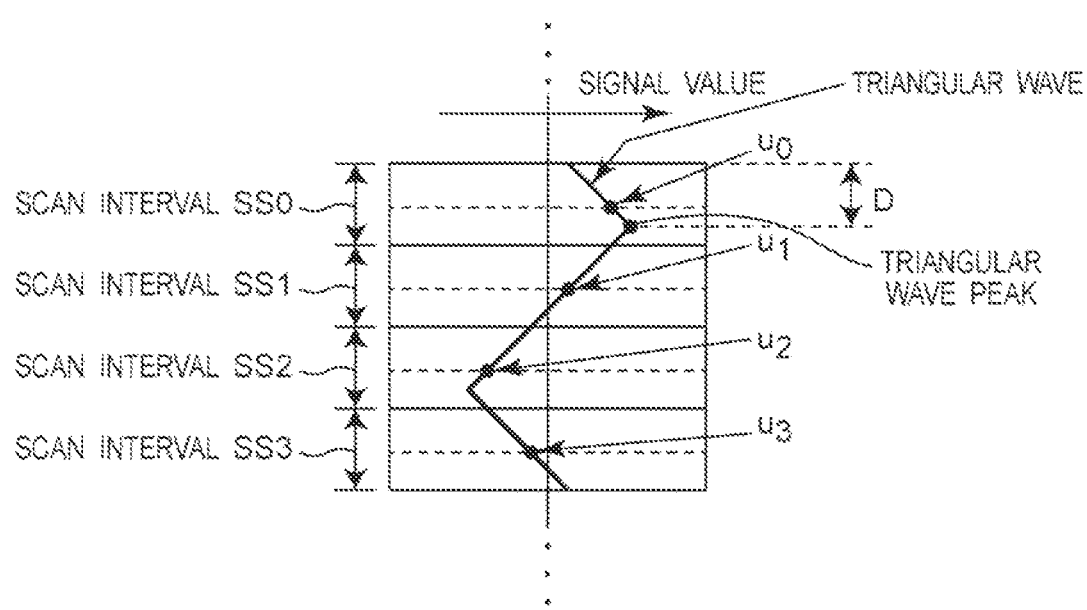
FIG. 7 is a diagram showing an optimal modulation method according to a modified embodiment, and is a conceptual diagram showing signal values in scan intervals SS0 to SS3.

FIG. 7 is a diagram showing an optimal modulation method according to a modified embodiment, and is a conceptual diagram showing signal values in the scan intervals SS0 to SS3. In this case, paying our attention to the position D of the positive peak of the triangular wave signal values of FIG. 7, the method for detecting the position as a continuous quantity (demodulation scheme) will be described below.

$$h = \begin{cases} \dfrac{w}{2(v+w)}, & \text{if } vw \geq 0; \text{ and} \\ \dfrac{v}{2(v-w)} + \dfrac{1}{2} & \text{if } vw < 0. \end{cases}$$

By using the function of the above equation, the position D is expressed by the following equation:

$$D = \begin{cases} 2h & \text{if } w \geq 0; \text{ and} \\ 2(1+h) & \text{if } w < 0. \end{cases}$$

In this case, D denotes the phase of the triangular wave, and the value can be changed, then the information can be transmitted by performing phase modulation (256-PSK) at 256 positions, for example. By demodulating the phase modulated signal of 256 positions using the above equation (9), 8-bit information can be obtained from the luminance of the four scan intervals SS0 to SS3. In this case, the entire screen includes 25 (=100/4) sets each set having four intervals can be taken, and then, the information transmission rate by the method with the video camera of 60 frame/second is 12,000 bit/second=60×(100/4)×8. The excellent points of the method are as follows:

(1) any Fourier transformation is not required in the demodulation; and (2) instead of using the absolute value of the luminance of the screen, only the difference thereof and the value of ratio are used, and then, it is difficult to be affected by the accompanying change in luminance value due to the change in the movie photographing conditions.

Removal of the Influence of Obstacle by Deconvoluation

In the video camera of rolling shutter type as mentioned above, it is assumed that the entire portion of the photographing frame uniformly receives modulated light from the modulated light source, which is modulated in accordance with the signal from the signal source. However, according to the implementation method, there may be an obstacle between the modulated light source and the video camera, where the obstacle blocks or weakens a part of the modulated light source.

When the transfer function of the obstacle (which is the function contributing to the photographing frame I) is X, the photographed frame I' is expressed as the following equation for the photographing frame I with no obstacle:

$$I' = XI.$$

In the frequency space, when the one-dimensional Fourier transformation of the transfer function X of the obstacle is denoted by χ, the spectrum of the photographing frame I is expressed by the following equation:

$$B'=\chi *B,$$

where * indicates a convolution operation. This relationship is expressed by the following equation using the convolution matrix χ:

$$B'=\chi B.$$

Since the convolution matrix χ has an inverse matrix under a predetermined condition, the influence of the obstacle can be removed in the frequency space as shown in the following equation:

$$B=\chi^{-1}B',$$

where $\chi^{-1}$ is the inverse convolution (deconvolution) matrix with respect to the obstacle X. Therefore, as shown in the above equation, the information on the obstacle can be removed to improve the error rate in the data communications, by multiplying the Fourier transform coefficient B' of the frame output signal of the visible light signal by the deconvolution ($\chi^{-1}$) of the Fourier transform of the obstacle transfer function existing between the information transmitting apparatus 1 and the information receiving apparatus 2.

Multiplexing of Information Transmission Communication

Figure 8:
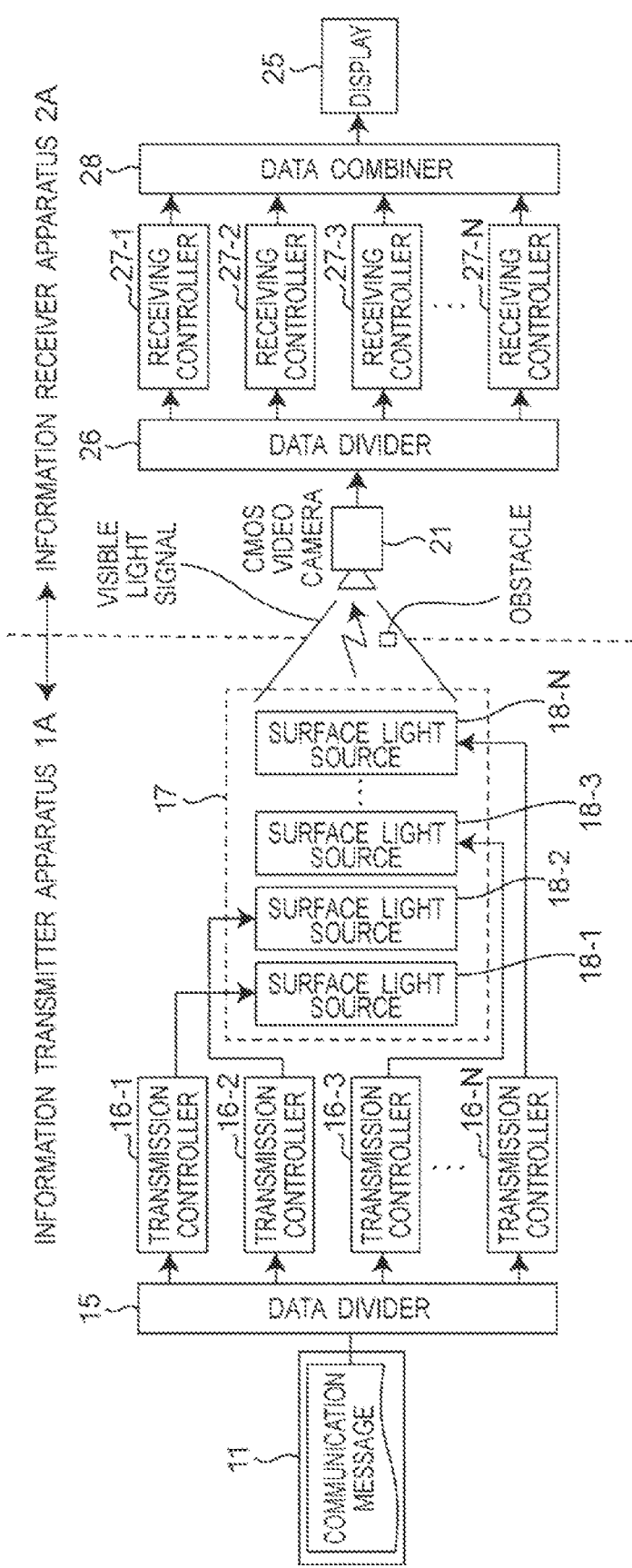
FIG. 8 is a block diagram showing a configuration example of an information transmitter apparatus 1A and an information receiver apparatus 2A using a data division method according to a modified embodiment.

FIG. 8 is a block diagram showing a configuration example of an information transmitter apparatus 1A and the information receiver apparatus 2A, each having a data division method according to a modified embodiment. Referring to FIG. 8, the information transmitter apparatus 1A is configured to include a memory 11, a data divider 15, a plurality of N transmission controller 16-1 to 16-N, and a surface light source unit 17. In this case, the respective transmission controller 16-1 to 16-N correspond to the packet generator 12 and the modulation processor 13 of FIG. 2A. Also, the information receiver apparatus 2 is configured to include a data divider 26, a plurality of N receiving controller 27-1 to 27-N, a data combiner 28, and a display 25. In this case, the respective receiving controller 27-1 to 27-N correspond to the demodulation processor 22, the packet processor 23, and the error corrector 24 of FIG. 2B.

In the communication system or method according to the above-mentioned embodiment, the modulated light source is the surface light source 14, and it is assumed that the modulated light from the surface light source 14 is received by the entire photographing frame of the CMOS video camera 21. However, as shown in FIG. 8, a plurality of N surface light sources 18-1 to 18-N each having a vertically elongated shape, for example, is arranged laterally or horizontally, for example, and they are operated in synchronization with each other (the sending screen is divided into a plurality of divided screens), and then, the data divider 15 controls the respective transmission controllers 16-1 to 16-N and the respective surface light sources 18-1 to 18-N to divide and distribute the digital data signal of the communication message and to control transmission, drive and transmit divided communication messages. The transmitted modulated light signal having a surface shape is received by one CMOS video camera 21, and the data divider 26 divides the received modulated light signal into a plurality of data signals corresponding to the photographed light source areas (divided screens). The receiving controllers 27-1 to 27-N (corresponding to the transmission controllers 16-1 to 16-N) control receiving of the received data signals, and then, the data combiner 28 processes the received digital signals to combine the same digital signals. As a result, the communication rate can be multiplied to obtain a plurality of N communication rate by using the N surface light sources 18-1 to 18-N, and this results in that special division multiplex can be performed. It is noted that, when a plurality of receiving controllers is provided, the operations of the plurality of receiving controllers can be synchronized to each other by using the synchronization signal included in the visible light signal.

A recent light source device is a surface light source, and can emit three-color lights of RGB independently, and a recent video camera can also receive respective color light signals of RGB separately. Using this property, divided communication messages having RGB colors are transmitted separately, and the same messages are received separately, so that the communication rate can be multiplied to three time the communication rate. As a result, wavelength division multiplex can be done. In the above-described space division multiplexing information transmission system has the configuration shown in FIG. 8, but the wavelength division multiplexing information transmission system can be configured by changing the same configuration as follows in FIG. 8:

(1) the surface light source 18-1 to 18-N are changed to a driving unit for driving the respective color information of the surface light source unit 17; and (2) the data divider 26 divides the data signal into the respective pieces of color information.

The space division multiplexing and the wavelength division multiplexing may be used in combination.

Suppression of Flicker

The light source used for information transmission communication according to the present embodiment is made to emit light with a fundamental frequency which is the fundamental frame frequency of the CMOS video camera 21, and the fundamental frame frequency becomes approximately 60 Hz in many current CMOS video camera 21. The spectral components is detected as flicker in user's eyes. In the carrier order k, the carriers of the carrier orders k=1, 2, 3 are not used, and the carriers of k≥4 are used. Thus, the spectral components include only those of 240 Hz and higher, and it becomes the light source with no flicker to be recognized in many cases. Since the carrier order k to be used can be freely selected in the communication system or method of the present embodiment, the modulation surface light source with no flicker can be provided by avoiding the use of lower-orders of harmonics, so that the application range of visible optical communications can be expanded.

Synchronization Between Information Transmitter Apparatus and Information Receiver Apparatus In the communication method according to the present embodiment, prior to the communication, the operation timings between the information transmitter apparatus 1 and the information receiver apparatus 2 are synchronized to each other by using the synchronization part 31 (FIG. 1) at the beginning of the communication packet. This operation can perform clock synchronization between the transmitter and the receiver with a precision of about several microseconds by using the CMOS video camera 21 having about 100 scanning lines at a frame rate of 60 frame/second. This synchronization operation can synchronize one light source with the plurality of CMOS video cameras 21, and the image with a plurality of viewing points by a plurality of cameras can be photographed at the same frame timing. For example, there are applications such as photographing moving objects with a stereo camera.

In addition, an audio signal is transmitted together with transmission of the communication message by the information transmitter apparatus 1, and the audio signal is received by a receiver microphone, then the timing of the optical signal of the camera and the timing of the audio signal are compared with each other, so that the absolute value of the propagation delay time of the audio signal can be known. The propagation speed of the audio signal is multiplied by the propagation delay time of the audio signal, so that the distance between the audio speaker of the information transmitter apparatus 1 and the microphone of the information receiver apparatus 2 can be obtained, and the mutual geometric arrangement between the information transmitter apparatus 1 and the information receiver apparatus 2 can be determined. This is used for positioning applications such as application for knowing the position of the information receiver apparatus 2 if the position of the speaker is determined in advance (for example, see Non-Patent Document 2).

Modified Embodiments

In the above embodiments, the information receiver apparatus 2 is configured by using the smartphone. However, the present invention is not limited to this, and the information receiver apparatus 2 may be configured by using electric equipment such as a personal computer.

In the above embodiments, the CMOS video camera 21 of rolling shutter type is used. However, the present invention is not limited thereto, and a video camera of rolling shutter type may be used.

Industrial Applicability

As described above in detail, according to the information transmission system and the like according to the present invention, it is possible to provide an information transmission system capable of performing visible optical communications at a higher rate than the prior art.

EXPLANATION OF SYMBOLS 1, 1A: Information transmitter apparatus,
2, 2A: Information receiver apparatus,
11: Memory,
12: Packet generator,
13: Modulation processor,
14: Surface light source,
15: Data divider,
16-1 to 16-N: Transmission controller,
17: Surface light source unit,
18-1 to 18-N: Surface light source,
20: Controller,
20m: Program memory,
21: CMOS video camera,
22: Demodulation processor,
23: Packet processor,
24: Error corrector,
25: Display,
26: Data divider,
27-1 to 27-N: Receiving controller,
28: Data combiner,
31: Synchronization part,
32: Data part,
33: Parity part,
41: Symbol disassembler,
42-1 to 42-K: QAM modulator,
43: Inverse Fourier transformer,
51: special Fourier transformer,
52-1 to 52-K: Rotation amplitude corrector,
53-1 to 53-K: QAM demodulator, and
54: Symbol bit sequence converter.

The invention claimed is:

1. An information transmitter apparatus for use in an information transmission system, the information transmission system comprising:
the information transmitter apparatus that transmits a visible light signal using a surface light source, the visible light signal being secondarily modulated according to a primarily modulated signal, the primarily modulated signal being obtained by primarily modulating a plurality of respective-order carriers different from each other, the respective-order carriers having a fundamental frequency and multiple frequencies which are respectively identical to a fundamental frequency and multiple frequencies of a frame output signal of a video camera of rolling shutter type provided in an information receiver apparatus; and
the information receiver apparatus that receives the visible light signal using the video camera,
wherein the information transmitter apparatus comprises a modulator that quadrature-amplitude-modulates the respective-order carriers in accordance with an input digital data signal, and inverse-Fourier-transforms modulated carriers to generate the modulated signal.

2. The information transmitter apparatus as claimed in claim 1,
wherein the modulator quadrature-amplitude-modulates the respective-order carriers in accordance with the input digital data signal, so that intensity signals, which are obtained in a plurality of intervals obtained by dividing the frame output signal of the video camera at equal intervals, become a predetermined set value.

3. The information transmitter apparatus as claimed in claim 2,
wherein the modulator generates the modulated signal, so that a position of a triangular wave peak, which is determined by each of the intensity signals obtained in the plurality of intervals obtained by dividing the frame output signal at equal intervals, is changed.

4. The information transmitter apparatus as claimed in claim 1,
wherein the modulator modulates the respective-order carriers excluding predetermined low-order carriers.

5. An information receiver apparatus for use in an information transmission system, the information transmission system comprising:
an information transmitter apparatus that transmits a visible light signal using a surface light source, the visible light signal being secondarily modulated according to a primarily modulated signal, the primarily modulated signal being obtained by primarily modulating a plurality of respective-order carriers different from each other, the respective-order carriers having a fundamental frequency and multiple frequencies which are respectively identical to a fundamental frequency and multiple frequencies of a frame output signal of a video camera of rolling shutter type provided in the information receiver apparatus; and the information receiver apparatus that receives the visible light signal using the video camera, wherein the information receiver apparatus comprises a demodulator that Fourier-transforms the frame output signal of the visible light signal outputted from the video camera, and quadrature-amplitude-demodulates Fourier-transformed frame output signals to generate a digital data signal.

6. The information receiver apparatus as claimed in claim 5, wherein the demodulator multiplies the frame output signal of the visible light signal by a deconvolution of a Fourier transform of a transfer function of an obstacle existing between the information transmitter apparatus and the information receiver apparatus to remove information on the obstacle.

7. The information receiver apparatus as claimed in claim 5, wherein the information receiver apparatus adjusts an operation timing between the information transmitter apparatus and the information receiver apparatus by correcting an operation timing of the video camera using a synchronization signal included in the visible light signal.

8. The information receiver apparatus as claimed in claim 7, wherein the information receiver apparatus comprises a plurality of the demodulators, and synchronizes operations of the plurality of demodulators with each other using the synchronization signal.

9. An information transmission system comprising:

an information transmitter apparatus that transmits a visible light signal using a surface light source, the visible light signal being secondarily modulated according to a primarily modulated signal, the primarily modulated signal being obtained by primarily modulating a plurality of respective-order carriers different from each other, the respective-order carriers having a fundamental frequency and multiple frequencies which are respectively identical to a fundamental frequency and multiple frequencies of a frame output signal of a video camera of rolling shutter type provided in the information receiver apparatus; and the information receiver apparatus that receives the visible light signal using the video camera, the video camera outputting the frame output signal, wherein the information transmitter apparatus comprises a modulator that quadrature-amplitude-modulates the respective-order carriers in accordance with an input digital data signal, and inverse-Fourier-transforms modulated carriers to generate the modulated signal, and wherein the information receiver apparatus comprises a demodulator that Fourier-transforms the frame output signal outputted from the video camera, and quadrature-amplitude-demodulates Fourier-transformed frame output signals to generate a digital data signal.

10. The information transmission system as claimed in claim 9, wherein the modulator modulates one of the carriers selected for a specific information receiver apparatus, using a harmonic of a carrier order corresponding to the specific information receiver apparatus, and wherein the demodulator selectively demodulates the digital data signal only in the specific information receiver apparatus by setting a predetermined exposure time ratio corresponding to the carrier order in the video camera.

11. The information transmission system as claimed in claim 9, wherein the information transmitter apparatus comprises:

a data divider that divides the digital data signal into a plurality of digital data signals corresponding to a plurality of divided screens when a screen to be transmitted is divided into the plurality of divided screens;

a plurality of the modulators that modulate the carrier into a plurality of modulated signals in accordance with the divided digital data signals; and a plurality of the light sources driven according to the plurality of modulated signals, and wherein the information receiver apparatus comprises:

a plurality of the demodulators that demodulate respective digital data signals corresponding to the plurality of divided screens; and a combiner that combines the digital data signals from the plurality of the demodulators into one digital data signal.

12. The information transmission system as claimed in claim 9, wherein the information transmitter apparatus comprises:

a data divider that divides the digital data signal into a plurality of respective divided digital data signals corresponding to a plurality of color information when a screen to be transmitted is divided into the plurality of color information;

a plurality of the modulators that modulate a carrier into a plurality of modulated signals in accordance with the respective divided digital data signals; and a plurality of the light sources respectively driven by the plurality of color information according to the plurality of modulated signals, and wherein the information receiver apparatus comprises:

a plurality of the demodulators that demodulate the respective digital data signals corresponding to the plurality of color information; and a combiner that combines the digital data signals from the plurality of demodulators into one digital data signal.

13. A non-transitory computer-readable recording medium storing a program that causes a computer to execute operations of an information receiver apparatus, wherein the information receiver apparatus is provided for use in an information transmission system, the information transmission system comprising:

an information transmitter apparatus that transmits a visible light signal using a surface light source, the visible light signal being secondarily modulated according to a primarily modulated signal, the primarily modulated signal being obtained by primarily modulating a plurality of respective-order carriers different from each other, the respective-order carriers having a fundamental frequency and multiple frequencies which are respectively identical to a fundamental frequency and multiple frequencies of a frame output signal of a video camera of rolling shutter type provided in the information receiver apparatus; and the information receiver apparatus that receives the visible light signal using the video camera, the video camera outputting the frame output signal, and wherein the operations include a step of, by the information receiver apparatus, Fourier-transforming the frame output signal outputted from the video camera, and quadrature-amplitude-demodulating Fourier-transformed frame output signals to generate a digital data signal.

14. The non-transitory computer-readable recording medium as claimed in claim 13,
wherein the information receiver apparatus is electronic equipment.

* * * * *